March 3, 1964 L. E. KUNTZ 3,123,252
METHOD AND APPARATUS FOR SUPPLYING AN ADDITIVE
TO A FLUID BEING DISPENSED
Filed Nov. 30, 1961 2 Sheets-Sheet 1

INVENTOR.
L. E. KUNTZ
BY
ATTORNEYS

INVENTOR.
L. E. KUNTZ
ATTORNEYS

United States Patent Office 3,123,252
Patented Mar. 3, 1964

3,123,252
METHOD AND APPARATUS FOR SUPPLYING AN ADDITIVE TO A FLUID BEING DISPENSED
Louis E. Kuntz, Bartlesville, Okla., assignor to Phillips Petroleum Company, a corporation of Delaware
Filed Nov. 30, 1961, Ser. No. 155,943
16 Claims. (Cl. 222—1)

This invention relates to supplying an additive to a fluid. In one aspect the invention relates to a method for supplying an additive to a fluid being delivered and to stop delivery of said fluid when said additive is not supplied. In one aspect this invention relates to means for dispensing a fluid and supplying an additive thereto and for preventing delivery of the fluid when the additive is not supplied. In another aspect this invention relates to L.P.G. key stop dispensing apparatus including means for supplying an odorant at the time of delivery and for preventing delivery when the odorant is not supplied in normal amount.

The term "key stop loading" has been applied to loading facilities which allow customers to load their own delivery vehicles without supervision by the operator of the installation. Automated installations are being used in the loading of petroleum products into transport trucks, thus keeping transport equipment in operation 24 hours a day even where continuous manning of loading racks is uneconomical. It is desirable to utilize such installations in the delivery of L.P.G. However, due to the type of use to which this product is put, for example, household heating and cooking, it often is necessary to supply an odorant to the L.P.G. at the time of delivery to the transport truck. Where such deliveries are made without attendance of an operator of the loading facility, it is desirable to provide a positive indication that the odorant has been supplied and to prevent delivery of unodorized product.

An object of my invention is to supply an additive to a fluid.

Another object of my invention is to provide a positive indication of the supply of an additive to a fluid and to prevent delivery of the fluid when the additive is not supplied in normal quantity.

Another object of my invention is to provide unattended L.P.G. dispensing.

Another object of my invention is to dispense odorized L.P.G. with a positive indication of the odorant supplied and to prevent delivery when the odorant is not supplied in normal quantities.

Other aspects, objects and the advantages of my invention are apparent in the written description, the drawing and the claims.

According to my invention an additive is supplied to a fluid by metering the fluid, actuating an injection of the additive in response to a predetermined amount of flow of the fluid, producing a signal representing an analysis of any additive supplied, and stopping flow of the fluid when the signal indicates less than a predetermined amount of additive has been supplied. The analysis can be accomplished by passing the additive through an analysis zone containing a capacitance cell, thus, measuring the dielectric constant of the additive stream, recording the dielectric constant and automatically preventing flow of the fluid when this signal indicates less than a normal amount of the additive.

I have found that the desired results can be obtained by actuating an initial injection responsive to the initiation of the fluid delivery process and actuating subsequent additive injections at predetermined intervals of volume delivery of the fluid, and by stopping the flow of fluid when any one of the additive injections fails to produce a desired minimum quantity of the desired additive.

Also according to my invention there is suppleid apparatus for supplying an additive to the fluid comprising means for metering the fluid, means for producing a volume signal and actuating an injection of the additive through an additive conduit, an analyzer in the conduit, means for producing a signal representing the analysis of the additive stream and means for stopping flow of the fluid when the signal representing the analysis represents less than a desired minimum quantity of additive supplied.

My invention includes apparatus comprising a fluid dispensing conduit, a meter in the conduit, a switch, means to close the switch momentarily responsive to predetermined volumes of flow through the meter, additive delivery means actuated by the switch, a capacitance cell in the delivery means, a dielectric monitor connected with the cell, means actuated by the switch to stop flow through the conduit and means actuated responsive to a value of signal to the cell representing a desired flow of the additive to disable the means to stop flow. My apparatus is well suited for delivery of odorized liquefied petroleum gas and for key stop L.P.G. dispensing operations.

In the drawing FIGURE 1 is a schematic diagram of an L.P.G. loading system including odorizing means.

Figure 1:
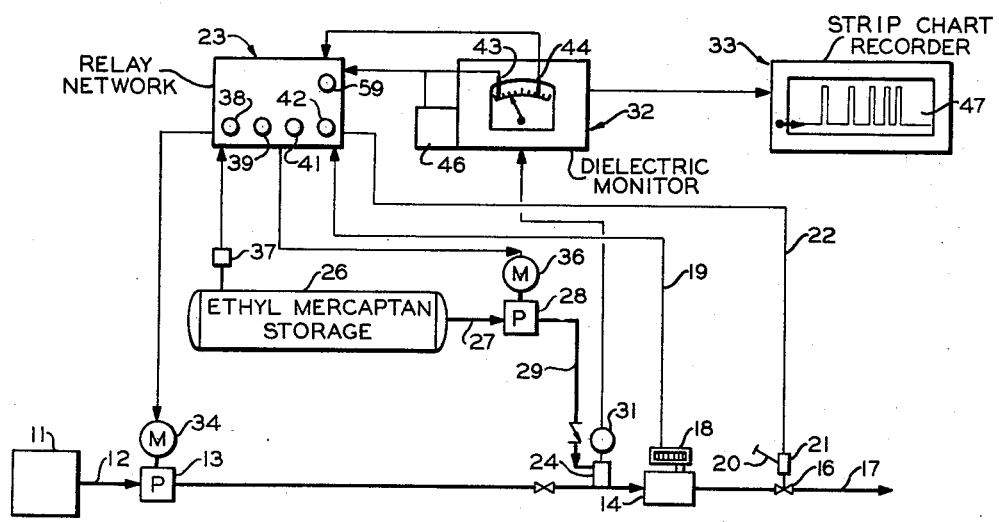

In FIGURE 1 the primary L.P.G. supply system includes an L.P.G. source 11 connected to a pipe 12 and a pump 13, the outlet of which is connected through a meter 14, and a set-stop valve 16 with a pipe 17 leading to suitable means for delivery to a tank truck (not shown). Meter 14 is provided with a head 18 which includes both a volume counter, which may include both a resetable dial and an accumulative dial, and a set-stop mechanism. A lever 20 is manually operated to open valve 16. The set-stop mechanism includes a counter which can be set to the desired total delivery and when this delivery is reached a mechanical linkage automatically releases lever 20 to permit valve 16 to close. A solenoid 21 is provided, associated with the set-stop mechanism, the mechanism being operative to allow valve 16 to open only when solenoid 21 is energized. The circuit which actuates solenoid 21 to open valve 16 must be completed through control box 23. A capacitance cell 24 is connected into outlet of pump 13 as shown, cell 24 serving also as the injection nozzle for the odorant. The odorant is fed from a storage tank 26 through pipe 27, pump 28 and pipe 29.

Cell 24 is provided wtih a transmitter 31 which sends a signal proportional to the dielectric constant of the material in cell 24 to dielectric monitor 32 which in turn transmits a signal to strip chart recorder 33. Monitor 32 can actuate either of two relays, one at a high level set point, the other at a low level set point. These relays in turn actuate contacts in the circuits described more completely with relation to FIGURE 3. Pumps 13 and 28 are provided with motors 34 and 36 respectively, the starting circuits of which are connected with control box 23. A level sensor 37 is associated with storage tank 26 and actuates a switch which is included in the circuits illustrated in FIGURE 3. Control box 23 is also provided with a key actuated switch 38, a push button actuated switch 39, an odorant low level alarm 41 and a monitor failure alarm 42. The contacts for relays (not shown) actuated by dielectric monitor 32 are indicated at 43 and 44 while a fail safe contact is indicated at 46. Strip chart recorder 33 produces a printed record 47 which records the odorant injection.

Figures 3, 4:
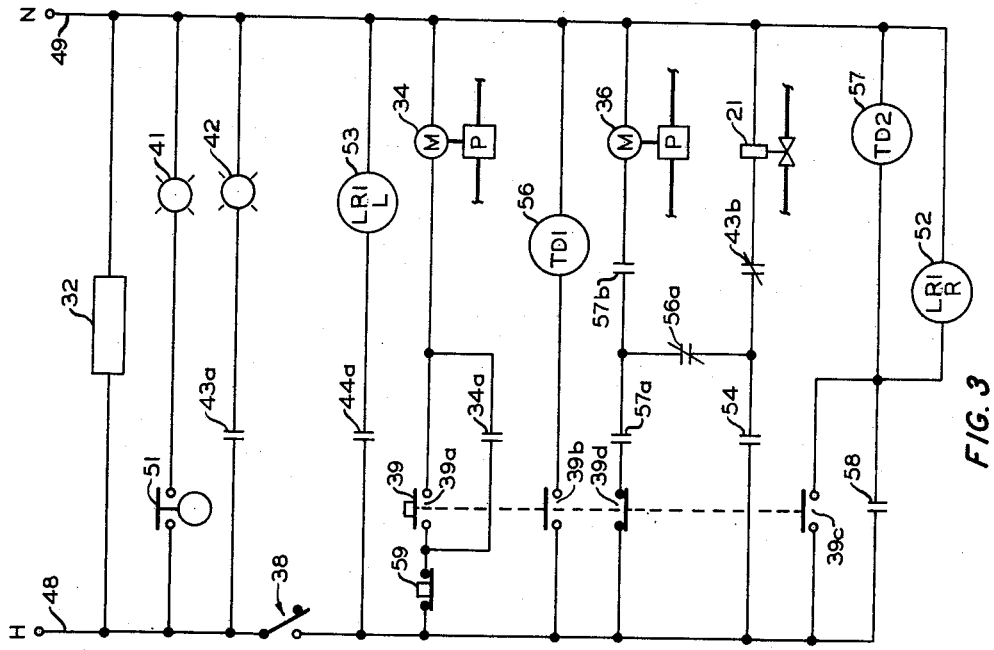
FIGURE 3 is a schematic circuit diagram of automatic control and alarm means.
FIGURE 4 is a cross-section of a capacitance cell.

Head 18 is also provided with a switch which completes a circuit through a conductor 19 to actuate the system as explained more fully below. Referring to FIGURE 1 and FIGURE 3, in operation a suitable source of electrical energy is supplied through conductors 48 and 49. Monitor 32 is connected between these conductors as illustrated. Switch 51 is actuated by level sensor 37 to complete a circuit through alarm 41. Relay 43, actuated by a low level set point in monitor 32 controls normally open contacts 43a and normally closed contacts 43b. A latching relay in control box 23 is provided with a first releasing circuit 52 and a latching circuit 53. When this relay is in a released position, contacts 54 are open and conversely when the relay is latched, the contacts 54 are closed. A first time-delay relay 56 and a second time-delay relay 57 are connected as shown, both of these relays having the delay on deenergization. Relay 56, that is, actuates instantaneously upon being energized but has a 30 second delay on deenergization. Similarly relay 57 actuates instantaneously upon being energized but has a 20 second delay on deenergization. Relay 56 controls normally closed contacts 56a while relay 57 controls normally open contacts 57a and 57b. Relay 44 actuates normally open contacts 44a. Motors 36 and 34 are shown connected directly across the control circuit although it is preferable that only the starting circuits be so connected and that the motors be energized from a separate source. Starting push button switch 39 actuates normally open contacts 39a, 39b and 39c and normally closed contacts 39d. The contacts of the switch in head 18 which is actuated periodically at equal intervals of flow through meter 14, are indicated at 58. A stop switch 59 is provided to break the circuit to discontinue the operation of motor 34 if desired. Fail safe contacts 46 (not shown in FIGURE 3) also will interrupt this circuit if the oscillator circuit of monitor 32 fails.

In operation, a trucker drives his truck into position at the loading dock and connects from pipe 17 through suitable connections (not shown) to the truck tank. The trucker then inserts his key in switch 38 to energize the system. It will be understood that similar switches in parallel are provided for various trucker customers. He then pushes and releases push button 39, thus energizing motor 34 and locking this circuit in through contact 34a. Time delay relays 56 and 57 are actuated and contact 39d opened. Since relay 57 has a time delay of 20 seconds on deenergizing, contacts 57a and 57b remain closed for this length of time, thus actuating motor 36 to pump odorant for 20 seconds. Since contacts 56a are open, and since these contacts are closed only after a 30 second delay, the circuit is not completed through solenoid 21 at this time. Odorant is pumped from pump 28 through pipe 29 and through cell 24. When the odorant is sensed by monitor 32 the upper set point is reached thus closing contacts 44 which activates a relay to close contacts 44a to complete a circuit through latching circuit 53 to cause the corresponding relay to latch and contacts 54 to close and remain closed. This energizes solenoid 21 thus permitting valve 16 to be opened and L.P.G. to flow therethrough. After a desired quantity has been transferred, for example 1,000 gallons, the contacts 58 of the switch in meter head 18 close thus energizing relay 57, closing contacts 57a and 57b, starting motor 36 which runs during the time delay of relay 57. At the same time release circuit 52 is energized to allow contacts 54 to open. Since time delay relay 56 is not actuated at this time contacts 56 remain closed thus permitting solenoid 21 to be energized through contacts 57a. Assuming the odorant is properly fed, again it will be sensed at cell 24, again closing contacts 44, closing contacts 44a to relatch the relay controlled by circuit 53, closing contacts 54 prior to the time delay of relay 57 which, after this delay period, opens contacts 57a. To prevent release of contact 54 prior to the closing of contact 57a, relay circuit 52 is provided with a very brief actuation delay.

On the other hand, if for any reason the odorant is not injected, contacts 44 are not closed, contacts 44a remain open thus allowing contacts 54 to remain open and the valve 16 closes after the time delay period of 57 at which time contacts 57a open. Valve 16 cannot be opened until the odorant has been injected.

Figure 2:
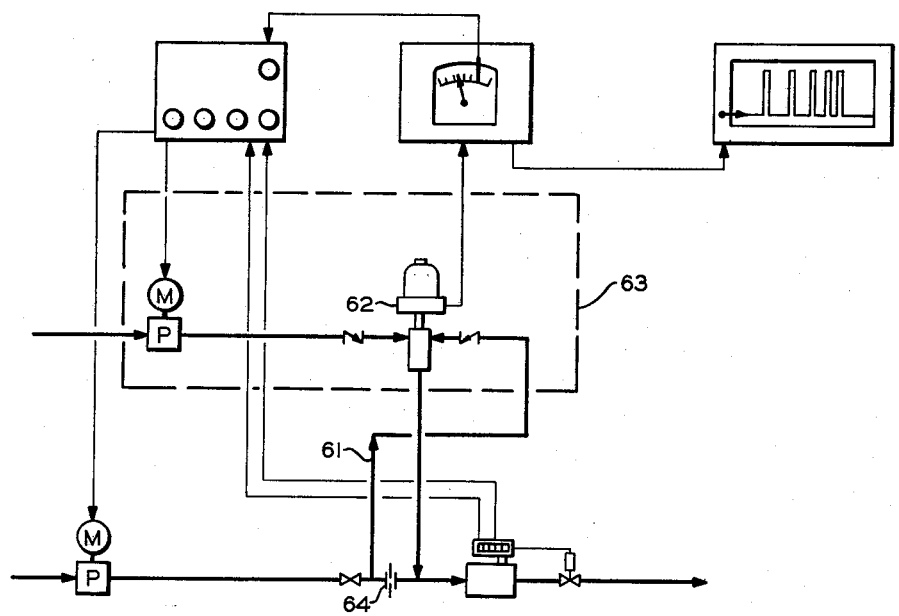
FIGURE 2 is another embodiment of an L.P.G. loading and odorizing system in which the odorant is supplied to a by-pass stream.

In a preferred operation the odorant for the liquefied petroleum gas is ethyl mercaptan which has a dielectric constant of approximately 8 as compared with a value of approximately 2 for the L.P.G., thus providing a large, very positive indication on chart 47 that the odorant has been properly injected. Both cell 24 and the capacitance cell of unit 62 illustrated in FIGURE 2, are arranged so that the analysis is made substantially on the pure stream of additive thus providing an indication of the substantially undiluted additive to obtain the large deflection previously noted on chart 47.

In case of failure of the monitor output circuit, low set point contacts 43 are closed actuating a relay (not shown) to close contacts 43a to actuate monitor failure alarm 42, and opening contacts 43b to break the circuit to solenoid 21, allowing valve 16 to close to discontinue transfer of L.P.G. A failure of the monitor oscillator circuit closes contacts 46 which actuate the same relay actuated by contacts 43. Neither of these is essential to the operation of the present invention since the system will be shut down by failure to close contacts 44, but since they actuate the monitor failure light 42, they provide an indication of the reason for shutdown.

When the odorant in tank 26 reaches a predetermined low level, switch 51 is actuated to energize alarm 41. If this alarm is not heeded and the odorant supply is exhausted, the system is shut down as described above since the monitor 32 does not detect any injection and complete the necessary cycle to keep the solenoid 21 energized.

When the start button 39 is pressed to start a loading cycle, it automatically energizes circuit 52, thus releasing the relay to open contacts 54 so that the injection cycle necessarily must include an injection of odorant prior to beginning the loading operation.

As noted above, the stop switch 59 can be used to stop motor 34 and thus pump 13 if for any reason it is desired to discontinue transfer of L.P.G. independent of the control circuit. If push button switch 39 is inadvertently actuated it only causes an additional injection of odorant which causes no real harm.

The operation of the system illustrated in FIGURE 2 is similar except that the odorant is injected into a bypass conduit 61. This permits the use of a unitary capacitance cell and transmitter 62 and further permits the odorant pump, motor, and unit 62 to be packed in one explosion-proof unit 63.

Capacitance cell 24 and transmitter 31 are shown in cross-section in FIGURE 4, and comprise a threaded body 66, having a cylindrical electrode 67 made thereon, and a central electrode 68 extending through body 66 and connected with a conductor 69. A protective enclosure 70 is attached to body 66 by means of nipple 71, threaded to enclosure 70 and welded to body 66, which supplies a good electrical connection. A coaxial cable connector 72 is provided in enclosure 70, the central conductor being connected with conductor 69 and the outer conductor with protective enclosure 70 and, through nipple 71 and body 66, with cylindrical electrodes 67. Preferably the volume within electrode 67 is not more than and preferebly somewhat less than the amount of a desired odorant injection. Thus, when odorant is injected through conduits 73 and 74 substantially the entire space within cylindrical electrode 67 is filled with the odorant so that a full scale deflection is obtained on the monitor. This is desirable so that the maximum deflection point can be determined accurately and the dispensing equipment shut down upon obtaining anything less than substantially full scale deflection.

Suitable equipment for other components of my combination can be obtained commercially. For example, a suitable set stop valve is the valve illustrated in Drawing 503733 of A. O. Smith Corporation. This apparatus includes a manually actuated valve, which can be operated only when a solenoid in the apparatus is energized and in which the valve automatically closes at any time the solenoid is not energized. In this type of operation, to deliver fluid it is necessary to press the start button and to actuate the set stop valve. Meter switch 18 can be a type "C" transmitter described in Bulletin 185 of A. O. Smith Corporation. A suitable instrument for use as the dielectric monitor is the dielectric monitor Model TDM of United Engineers Incorporated. Another suitable combination of instruments comprises the Type 4450 sensor, Type 4450 transmitter and Type 705 diverter controller, all made by Fisher Governor Company and shown in their Bulletin 0-4450, for the function served by cell 24, and monitor 32.

To provide the necessary pressure drop to force flow through by-pass conduit 61, it is desirable to have a flow restriction between the two by-pass taps, such as orifice 64, for example. Of course, other means for providing the flow energy, such as pumps, etc., can be used.

Reasonable variation and modification are possible in the scope of my invention which sets forth method and apparatus for injecting an additive into a flowing stream, analyzing for the additive and recording the analysis, and automatically stopping delivery of the fluid if the additive is not properly injected.

I claim:

1. A method for supplying an additive to a fluid comprising the steps of metering a stream of said fluid, producing a signal representing a predetermined volume of said fluid and actuating an injection of at least a predetermined amount of said additive through an analysis zone into said stream in response thereto, producing an analysis signal indicative of the presence of said additive while passing said additive through said analysis zone, recording said analysis signal and stopping the flow of said fluid responsive to said analysis signal when said analysis signal corresponds to an injection of said additive less than said predetermined amount.

2. The method of claim 1 wherein said fluid is liquefied petroleum gas and said additive is an odorant therefor.

3. A method for supplying an additive to a fluid comprising the steps of metering a stream of said fluid, producing a signal representing a predetermined volume of said fluid and actuating an injection of at least a predetermined amount of said additive through an analysis zone into said stream in response thereto, producing an analysis signal representing the dielectric constant in said analysis zone and automatically preventing flow of said fluid when said analysis signal indicates less than said predetermined amount of said additive while actuating said injection.

4. The method of claim 3 wherein said fluid is liquefied petroleum gas and said additive is an odorant therefor.

5. A method for dispensing a fluid and supplying an additive thereto comprising the steps of feeding said fluid through a delivery conduit, metering the flow of said fluid through said conduit, actuating an injection of at least a predetermined amount of said additive through an analysis zone into said fluid in response to a predetermined volume of flow of said fluid, producing an analysis signal representing an analysis of the fluid in said zone, and stopping flow of said fluid responsive to a value of said analysis signal representing less than said predetermined amount of said additive while actuating said injection of said additive.

6. The method of claim 5 wherein said fluid is a liquefied petroleum gas and said additive is an odorant therefor.

7. A method for dispensing a fluid and supplying an additive thereto comprising the steps of feeding said fluid through a delivery conduit, metering the flow of said fluid through said conduit, actuating an injection of at least a predetermined amount of said additive through an analysis zone into said fluid in response to a predetermined volume of said fluid, producing an analysis signal representing the dielectric constant in said analysis zone, recording said analysis signal, and automatically stopping flow of said fluid responsive to a value of said analysis signal representing less than said predetermined amount of said additive while actuating said injection of said additive.

8. The method of claim 7 wherein said fluid is liquefied petroleum gas and said additive is an odorant therefor.

9. Means for supplying an additive to a fluid comprising means for delivering and metering a stream of said fluid, means for producing a signal representing a predetermined volume of said fluid and means for actuating an injection of a predetermined amount of said additive through an analyzer into said stream in response thereto, means for producing a signal representing an analysis in said analyzer, means for stopping flow of said fluid responsive to said analysis signal when said analysis signal represents less than a predetermined amount of said additive while said injection of said additive is actuated.

10. Means for supplying an additive to a fluid comprising a fluid delivery conduit, a meter in said conduit, means actuated by said meter upon delivery of a predetermined volume of said fluid to actuate an injection of at least a predetermined amount of said additive through an analyzer into said conduit in response thereto, means for producing a signal representing a dielectric constant in said analyzer, and means for automatically preventing flow of said fluid when said signal representing dielectric constant indicates less than said predetermined amount of said additive.

11. Means for supplying an additive to a fluid comprising means for delivering and metering a stream of said fluid, means for producing a signal representing a predetermined volume of said fluid and means for actuating an injection of at least a predetermined amount of said additive through an analyzer into said stream in response thereto, means for producing a signal representing an analysis in said analyzer, a recorder for said signal means for stopping flow of said fluid responsive to said analysis signal when said analysis signal represents less than said predetermined amount of said additive.

12. Means for supplying an additive to a fluid comprising a fluid delivery conduit, a meter in said conduit, means actuated by said meter upon delivery of a predetermined volume of said fluid to actuate an injection of at least a predetermined amount of said additive through an analyzer into said conduit in response thereto, means for producing a signal representing a dielectric constant in said analyzer, a recorder for said signal and means for automatically preventing flow of said fluid when said signal representing dielectric constant indicates less than said predetermined amount of said additive.

13. Means for dispensing a fluid and supplying an additive thereto comprising a fluid delivery conduit, a meter in said conduit, means actuated by said meter to inject at least a predetermined amount of said additive through an analyzer into said fluid conduit in response to a predetermined amount of flow of said fluid, means for producing a signal representing analysis in said analyzer, and means for stopping flow of said fluid responsive to a value of said analyzer signal representing less than said predetermined amount of said additive.

14. Means for dispensing a fluid and supplying an additive thereto comprising a fluid delivery conduit, a meter in said delivery conduit, means actuated by said meter to inject said additive through an additive conduit into said delivery conduit in response to a predetermined volume of flow through said meter, an analyzer in said additive conduit for measuring the dielectric constant and producing a signal proportional thereto, and means for automatically preventing flow of said fluid when said signal representing dielectric constant is below a predetermined value.

15. Means for dispensing a fluid and supplying an additive thereto comprising a fluid dispensing conduit, a meter in said conduit, a switch, means to close said switch momentarily responsive to predetermined volumes of flow through said meter, additive delivery means actuated by said switch, a capacitance cell in said delivery means, a dielectric monitor operatively connected with said cell, means actuated by said switch to stop flow through said conduit, and means actuated responsive to a value of signal from said cell representing a flow of said additive to disable said means to stop flow.

16. Key stop liquefied petroleum gas dispensing apparatus comprising means for dispensing L.P.G. and supplying an odorant thereto including a fluid dispensing conduit, a meter in said conduit, a meter switch actuated by said meter, a key operated energizing switch to supply electrical energy to delivery and control means, a starter switch for energizing an L.P.G. pump motor and an odorant pump motor, means to close said meter switch responsive to a predetermined flow through said meter, means responsive to said meter switch to stop flow through said L.P.G. dispensing conduit, means responsive to said meter switch to actuate odorant delivery means, a capacitance cell in said delivery means, a dielectric monitor operatively connected with said cell, and means responsive to a value of signal from said cell representing a flow of said odorant to disable said means to stop flow through said L.P.G. delivery conduit.

References Cited in the file of this patent

UNITED STATES PATENTS

| | | |
|---|---|---|
| 2,510,158 | Van Ackeren | June 6, 1950 |
| 2,527,136 | Kagi et al. | Oct. 24, 1950 |
| 2,952,209 | Scholin | Sept. 13, 1960 |
| 2,977,024 | Harris | Mar. 28, 1961 |
| 3,033,422 | Totten | May 8, 1962 |